United States Patent Office 3,632,682
Patented Jan. 4, 1972

3,632,682
METHOD OF PREPARING BLOCK POLYMERS
Jules Darcy, Sarnia, Ontario, Canada, assignor to Polymer Corporation Limited, Sarnia, Ontario, Canada
No Drawing. Filed May 18, 1967, Ser. No. 639,275
Claims priority, application Canada, June 23, 1966, 963,667
Int. Cl. C08f 15/04, 27/00
U.S. Cl. 260—879 R
7 Claims

ABSTRACT OF THE DISCLOSURE

Block copolymers, for example of general form polystyrene-polybutadiene-polystyrene, are prepared by forming a two-block copolymer by a stepwise addition process using an anionic initiator, and adding a halogen to the two-block copolymer before deactivation, to effect coupling.

---

This invention relates to a process for the preparation of block copolymers.

Block copolymers are polymers in which the macromolecules comprise discrete polymeric segments, each segment being joined at one or each linear end to another discrete polymeric segment. Each segment may be a homopolymer or may be a random copolymer of two or more different monomeric units. Different segments may be polymers of the same monomers, and differ from each other only in the micro structure of the monomeric units.

Of particular interest among the block copolymers are those which comprise three blocks, the center block being composed of a rubbery polymer and each terminal block being composed of a plastic polymer, for example block copolymers of form polystyrene-polybutadiene-polystyrene. Such block copolymers have properties which are different from those of conventional random copolymers of the same monomers. They exhibit some properties characteristic of a plastic and some properties characteristic of a rubber. They thus have properties which are in a sense intermediate between the properties of homopolymers of the respective monomers. Thus the materials are thermoplastic and can be moulded at elevated temperatures. The materials are also rubbery, and do not require vulcanization or curing before exhibiting their rubbery properties such as high elasticity, high elongation at break and high tensile strength.

Such block copolymers are normally prepared by the "living polymer" or "step-wise-addition" technique. This technique involves the polymerization of a first monomer by anionic polymerization in solution using a suitable initiator of anionic polymerization such as butyl lithium, until complete conversion of monomer to polymer has been achieved. When a mono-functional initiator such as butyl lithium is employed, the result is a living polymer, so called because it has a terminal atom carrying a negative charge, or live end, which is associated with a positively charged lithium ion. Without killing the living polymer so formed, the second monomer is added to the reaction solution, and polymerization of this second monomer onto the live end of the previously formed living polymer occurs. After complete polymerization of the second monomer, a two-block copolymer has been formed, and a copolymer having the desired number of blocks can be prepared by repeating the steps as necessary, provided only that the pre-formed polymer is not killed at any stage of the process.

When a di-functional initiator such as dilithio diisoprene is used, the living polymer produced after the first step of the process has two live ends. Subsequent additions of the second monomer to this living polymer will cause polymerization onto both of these live ends, forming a three-block copolymer. This process can be repeated to produce five-, seven-, etc. block copolymers.

The chief disadvantages associated with the step-wise-addition process are that it is time-consuming, and that when preparing high molecular weight copolymers, the solution attains a high viscosity which makes thorough mixing of the solution during later stages difficult. Also, each addition of monomer to the solution entails the risk of introducing impurities which may kill the living polymers already formed, and it is therefore desirable that the number of such additions be kept to a minimum.

We have now found that these disadvantages can be reduced by a method of preparing block copolymers which involves the coupling of living polymer molecules by use of a halogen.

From its broadest aspect, the present invention provides a process for preparing multi-block copolymers which comprises the steps of polymerizing a first monomer by anionic polymerization, adding to the living homopolymer so formed a second monomer and allowing said second monomer to polymerize onto the end of said homopolymer, and coupling the living block copolymer formed by reacting the live ends thereof with a halogen. Preferably, the polymerization and coupling takes place in solution in an inert organic solvent.

In one aspect the process of invention is used to prepare three-block copolymers of form polystyrene-polybutadiene-polystyrene. After the first step, when as is usual the styrene has been allowed to polymerize to substantial completion a living polymer of styrene is formed, and after the second step of the process, when as is usual the butadiene has been allowed to polymerize to substantial completion a living two-block copolymer of form polystyrene-polybutadiene$^-$Li$^+$ (the charged end being the live end of the polymer) is formed. It appears that on subsequent treatment of the solution of living two-block copolymers with a halogen, the halogen reacts with the lithium atom associated with the live polymer end, and the lithium is removed from association with the polymer. Surprisingly, and by some means which is not presently fully understood, the polymer molecules then couple together through their live ends. The result of this coupling is a three-block copolymer of general form polystyrene-polybutadiene-polystyrene.

As shown in the specific examples presented hereinafter, the reaction with the halogen causes the intrinsic viscosity of the polymer solution to increase, indicating an increase in the molecular weight of the polymers in the solution. That pairs of polymer molecules have coupled together is further indicated by the fact that the physical properties of the products prepared by using the process of this invention on living two-block copolymers are almost identical with the properties of three-block copolymers prepared by the aforementioned living polymer technique. This indicates that the coupling reaction of two polymer molecules occurs through their live ends. In addition, the living polymer solutions show the characteristic colour of either polybutadiene ion or a polystyrene ion, depending upon which polymer has the live end. When the halogen is added to the solution, this characteristic colour disappears, indicating that the polymers in solution no longer have live ends.

Thus the coupling process of this invention has a distinct and definite advantage over such coupling methods previously proposed. No residue of coupling agent remains linking the polymer molecules in the process according to the invention. This not only eliminates any possibility of the fragment of the coupling agent interfering with the properties of block copolymer produced, but also eliminates the possibility of more than two living block copolymer molecules coupling together. When a fragment of a coupling agent remains as part of the product, there is always a chance that further polymer molecules will couple to this fragment by reaction at another reactive site thereon. The result is a "star type" polymer, the properties of which are different from those of linear block copolymers.

The products of this invention show remarkable strength and elastic properties in the uncured state, as well as thermoplastic properties. Other elastomer-forming monomers such as isoprene or piperylene may be used instead of the butadiene. Similarly other thermoplastic-forming monomers such as vinyl toluene, etc. may be substituted for styrene.

The intermediate formation of living polymers is preferably carried out in a non-polar hydrocarbon solvent. Particularly suitable such solvents are benzene, toluene, xylene, pentane, hexane, cyclohexane and heptane. Polar organic solvents such as tetrahydrofuran may also be used but are inferior in certain respects. The amount of solvent used depends upon the amount of monomer to be polymerized, and is chosen to give a suitable solution viscosity. The suitable initiators of anionic polymerization for preparing the living polymers will be well known to those skilled in the art, and include generally organo-metallic compounds of alkali metals. Preferred initiators are lithium hydrocarbyls such as methyl lithium, isopropyl lithium, n-butyl lithium, sec-butyl lithium, tertiary octyl lithium, n-decyl lithium, phenyl lithium, naphthyl lithium, 4-butyl phenyl lithium, cyclohexyl lithium, 4-phenyl butyl lithium, 1-tolyl lithium, 4-butyl cyclohexyl lithium and 4-cyclohexyl butyl lithium. Sodium compounds such as sodium alkyls, sodium napthalenes and sodium alpha methyl styrene tetrama are also useful.

Alternatively, dialkali metal compounds such as dilithio-diisoprene, dilithio-stilbene, dilithio-methane and 1,4-dilithio-butane may be used. When working with such di-functional initiators it appears that each polymer chain has two live ends. Thus after polymerizing the first monomer, which may be butadiene, a polymer of form (−polybutadiene−) is formed. Subsequent addition of second monomers such as styrene will lead to polymerization of the second monomer onto each end of the polybutadiene, to give a block copolymer of form −polystyrene-polybutadiene-polystyrene−. However, the results when working with di-functional initiators appear to be complicated by other factors, probably due to the effect of the organic fragment of the initiator, which may attach to the end of the living polymer. Thus for simplicity and ready reproducibility of results, it is preferred to use mono-lithium compounds such as n-butyl lithium or sec-butyl lithium.

The amount of initiator used per unit of monomer is determined on the basis of the desired molecular weight of the polymer blocks. Thus assuming that each organo-metallic molecule added causes initiation of one polymer chain, and that initiation can only occur by the use of an organo-metallic molecule, the mole ratio of alkali metal to monomer determines the molecular weight of the polymer. First polymer blocks of molecular weight about 1,000 to about 500,000 or higher can be produced by this method. Theoretically, to obtain a polymer of butadiene of molecular weight 1,000 using a convenient experimental charge of monomer such as one mole (54 grams), one thus requires 0.054 mole of mono-functional initiator. Theoretically, to obtain a polymer of butadiene of molecular weight 500,000 from the same amount of monomer, one would require $1.08 \times 10^{-3}$ moles of mono-functional initiator. However, unless all moisture and all active impurities are removed from the reaction mixture, some of the initiator will be deactivated before polymerization and this will lead to production of a polymer of molecular weight higher than that calculated.

The formation of the two-block copolymer should be carried out in an inert atmosphere. This is conveniently accomplished by sweeping out the reaction zone with an inert gas such as nitrogen, and carrying out the reaction in an atmosphere of nitrogen. Water should, of course, be excluded from the reaction zone, otherwise the initiator will be wholly or partially deactivated, and the living polymer will be killed. Thus all reagents should be anhydrous and the reaction vessels thoroughly dried before the process commences. Precautions should be taken also to prevent ingress of water into the reaction zone during the process.

The temperature of polymerization to form the two-block copolymer may vary over a wide range. Factors to be considered when choosing the reaction temperature are the rate of reaction, which varies with the chosen initiator and monomer system as well as with the temperature, and the nature of the solvent, which must be kept in liquid form. When a solution of benzene or toluene is used and the monomers are butadiene and styrene, a temperature of between about 20° C. and 70° C. is satisfactory. Depending upon the other factors detailed above, however, temperatures as low as −40° C. and as high as 100° C. may be used.

After the second monomer has been polymerized substantially to completion, the solution containing the living two-block copolymer is treated with a halogen to effect coupling. The preferred halogens are chlorine, bromine and iodine, bromine and iodine being especially preferred.

When chlorine is used as the coupling reagent, it may be added to the solution in gaseous form. The quantity of gas to be added may be measured by extracting from a chlorine-filled balloon at atmospheric pressure the required volume of chlorine gas in a syringe. The contents of the syringe are then discharged directly into the solution of living two-block copolymer.

Bromine and iodine are more conveniently handled as solutions in inert organic solvents, for example benzene or hexane. Solutions of known concentration of these reagents may be prepared, and the required quantity of such solution measured out in any convenient manner and added to the solution of living two-block copolymer.

The amount of coupling reagent added is best expressed in relation to the amount of initiator used, which theoretically corresponds to the number of live polymer ends in the solution. When using a mono-functional initiator such as butyl lithium, it is preferred to add between a half and two gram atoms of coupling reagent per gram molecule of initiator used originally. Large excesses of halogen should be avoided, as there is then a danger that the halogen will act as a chain-terminating agent instead of a coupling agent. Further, attack of the unsaturation of the polymeric diene by the halogen is a real possibility when the halogen is present in large excesses. It is thus advisable to use a quantity of halogen which is approximately equi-atomic with respect to the initiator.

The temperature of treatment with halogen is preferably at or near room temperature. This temperature may however be varied between about 0° C. and 60° C., provided that the solvent being used remains liquid within such temperature range. Higher temperatures are best avoided, to minimize the risk of the halogens attacking the unsaturation of the polymeric dienes of the block copolymer, or other undesirable side reactions.

As previously mentioned, the solutions of living block copolymers show the characteristic colour of the living ion present. On treatment with the halogen of the present invention, this colour disappears. This provides a method of determining when a satisfactory amount of coupling reagent has been added. The solution of halogen may be added slowly until the characteristic colour of the solution disappears. It is then known that no living ions remain in the solution. Further addition of halogen to provide an excess will lead to the solutions assuming the characteristic colour of the halogen being used.

Although the invention has primarily been described with reference to the production of three-block copolymers by the coupling of living two-block copolymers, it will be readily apparent that it is also applicable to the production of five-block and seven-block, etc. copolymers by the coupling of living three-block copolymers, living four-block copolymers, etc. respectively. The production of such multi-block copolymers is to be deemed to be within the scope of the present invention. Three-block copolymers are preferred due to their relative simplicity of production, and their outstanding properties as thermoplastic rubbers, but five-block copolymers in which the plastic polymer makes up both terminal blocks and the center block, and the rubbery diene polymer makes up the other two blocks, have similar properties and utility as thermoplastic rubbers.

Also, the term "halogen" is to be understood to include compounds formed between one halogen and another, for example iodine monochloride and iodine trichloride, but not compounds of halogen and other elements. The term does, however, include haloid compounds such as cyanogen, $(CN)_2$, and dithiocyanogen $(CNS)_2$.

The products of the present invention after recovery from solution and drying have a tensile strength in excess of 1,000 p.s.i. and an elongation at break of at least 200%. Further, they are thermoplastic, being mouldable and pressable at elevated temperatures. In block copolymers having the best combination of rubbery and thermoplastic properties, the plastic polymer comprises from about 20 to about 65 weight percent of the block copolymer, the especially preferred range being from about 30 to about 55 weight percent.

The invention will be further described with reference to specific examples.

EXAMPLE I

In this example, a living two-block copolymer of form polystyrene-polybutadiene$^-$ was prepared, containing 50 weight percent of styrene using butyl lithium as initiator, and coupled in accordance with the invention.

Three identical block copolymer solutions in benzene were prepared, using the following initial charge recipe, the ingredients being added to carefully dried, nitrogen-filled polymerization bottles in the following order:

Dry benzene—300 cc.
Styrene (dried over activated alumina)—40 grams
N-butyl lithium—4 cc. of a 1 molar solution in benzene.

The styrene was allowed to polymerize at room temperature to completion (about 2½ hours), and to the polymer solution so formed was added 40 grams of dry butadiene. After polymerization for a further 2½ hours the product was a solution of a two-block copolymer of general form polystyrene-polybutadiene$^-$ of 50 weight percent styrene.

Each block copolymer solution was then treated with a different halogen coupling reagent. The coupling agents, bromine, iodine and iodine monochloride (which is a solid under normal conditions of temperature and pressure) were added as standard solutions in benzene. The ratio of gram atoms of halogen to gram atoms of lithium (or, in the case of iodine monochloride, gram molecules of iodine monochloride to gram atoms of lithium) was in each case arranged to be 1:1. The bottles were vigorously shaken after addition of the coupling reagent at room temperature, for three hours. The polymers were then extracted from solution with a methanol mixture, dried and pressed into films.

To measure the strength properties of the polymers produced, microdumbbells of thickness 0.025 inch and width of 0.01 inch were prepared from the dried polymer by pressing, and subjected to strength tests.

The molecular weights of the polymers in solution are estimated from the measurements of intrinsic viscosity of the solution, using the well-known Mark-Houwink equation, $$\eta = KM^{\alpha}$$

where $\eta$ is the intrinsic viscosity, M is the molecular weight and K and $\alpha$ are constants depending upon the nature of the solution. In the present case values of $K = 3.3 \times 10^{-4}$ and $\alpha = 0.68$ were used.

The results are recorded in Table I.

TABLE I

| Bottle | A | B | C |
| --- | --- | --- | --- |
| Coupling agent | (1) | (2) | (3) |
| Ratio, coupling agent/lithium | 1/1 | 1/1 | 1/1 |
| Intrinsic viscosity before coupling | 0.634 | 0.322 | 0.292 |
| Estimated molecular wt. before coupling | 70,000 | 35,000 | 27,000 |
| Intrinsic viscosity after coupling | 0.837 | 0.509 | 0.473 |
| Estimated molecular wt. after coupling | 102,000 | 55,000 | 53,000 |
| Pressing temperature of product, °C | 107 | 107 | 107 |
| Tensile strength (p.s.i.) | 2,940 | 4,870 | 4,245 |
| Elongation at break (percent) | 730 | 755 | 800 |
| 100% modulus | 735 | 925 | 875 |
| 300% modulus | 760 | 950 | 980 |

¹ Bromine.  ² Iodine.  ³ ICl.

The tensile strengths of the polymers as recorded in Table I are remarkably high, in view of the relatively low molecular weights of the polymeric products.

EXAMPLE II

In this example two series of living two-block copolymers of form polystyrene-polybutadiene$^-$, one containing 40 weight percent of styrene and the other containing 50 weight percent styrene, were treated with different amounts of different coupling agents.

In Bottle B, a block copolymer solution in benzene was prepared, using the following initial charge recipe, the ingredients being added to a dry polymerization bottle as in Example I, in the following order:

Dry benzene—300 cc.
Styrene—32 grams
N-butyl lithium—4 cc. of a 1 molar solution in benzene.

The styrene was polymerized to substantial completion (about 2½ hours), at 50° C., and to the polymer solution so formed was added 48 grams of dry butadiene. After polymerization for a further 2½ hours at 50° C., the product was a solution of a living two-block copolymer of general form polystyrene-polybutadiene$^-$, of 40 weight percent styrene, and theoretical molecular weight of 20,000. This bottle was treated with iodine.

In Bottles A and C, living two-block copolymers of general form polystyrene-polybutadiene$^-$, containing 50 weight percent of styrene, were prepared using the same charge ingredients as detailed in Example I. The bottles were treated with different amounts of bromine as the coupling reagent.

The results are recorded in Table II.

TABLE II

| Bottle | A | B | C |
| --- | --- | --- | --- |
| Coupling agent | (1) | (2) | (1) |
| Atomic ratio, coupling agent/initiator | 0.5/1 | 0.75/1 | 2/1 |
| Intrinsic viscosuty before coupling | 0.309 | 0.360 | 0.389 |
| Estimated molecular wt. before coupling | 31,000 | 39,000 | 27,000 |
| Intrinsic viscosity after cupling | 0.487 | 0.553 | 0.425 |
| Estimated molecular wt. after coupling | 54,000 | 57,000 | 47,000 |
| Pressing temperature, °C | 107 | 107 | 107 |
| Tensile strength (p.s.i.) | 3,090 | 2,025 | 1,535 |
| Elongation at break (percent) | 710 | 1070 | 700 |
| 100% moldulus | 775 | 460 | 665 |
| 300% modulus | 805 | 460 | 785 |

¹ Bromine.  ² Iodine.

EXAMPLE III

In this example a two-block living copolymer of general form polystyrene-polyisoprene$^-$ was prepared, containing 50 weight percent of styrene.

The charge ratio was exactly the same as that recorded in Example I, except that 40 grams of isoprene was used instead of the 40 grams of butadiene of Example I.

The living block copolymer was coupled by adding a solution of bromine. The polymer was recovered and tested as previously described. The results are recorded in Table III.

TABLE III

| | |
|---|---|
| Coupling reagent: | Bromine |
| Atomic ratio, coupling reagent/lithium | 0.419 |
| Intrinsic viscosity before coupling | 0.419 |
| Estimated molecular weight before coupling | 47,000 |
| Intrinsic viscosity after coupling | 0.609 |
| Estimated molecular weight after coupling | 67,000 |
| Pressing temperature (° C.) | 107 |
| Tensile strength (p.s.i.) | 2085 |
| Elongation at break (percent) | 800 |
| 100% modulus | 900 |
| 300% modulus | 955 |

EXAMPLE IV

In this example, living three-block copolymers of general form polystyrene - polybutadiene - polystyrene were prepared and coupled using the various coupling agents of the invention.

The three-block copolymer was prepared using the following initial charge recipe, the ingredients being added in the following order:

Dry benzene—300 cc.
Styrene—20 grams
N-butyl lithium—4 cc. of a 1 molar solution in benzene.

The styrene was polymerized to completion at 50° C., and then 40 grams of dry butadiene was added. After complete polymerization of the butadiene, a further 20 grams of dry styrene was added, and the polymerization continued until the styrene had completely polymerized. The result was a three-block living copolymer of general form polystyrene-polybutadiene-polystyrene, containing 50 weight percent of styrene. Three identical block copolymer solutions were prepared.

Each solution was then treated with a different coupling reagent. In Bottle A, chlorine was added in gaseous form, by extracting the required volume of gas in a syringe from a ballon filled with chlorine gas, at atmospheric pressure. In Bottles B and C, bromine and iodine were added respectively as solutions in benzene. The treated solutions were shaken for three hours at room temperature, and the products were then recovered and tested as described in Example I.

The results are recorded in Table IV.

TABLE IV

| Bottle | A | B | C |
|---|---|---|---|
| Coupling agent | (1) | (2) | (3) |
| Atomic ratio, coupling agent/lithium | 1/1 | 1/1 | 1/1 |
| Intrinsic viscosity before coupling | 0.436 | 0.416 | 0.435 |
| Estimated molecular wt. before coupling | 48,000 | 47,000 | 48,000 |
| Intrinsic viscosity after coupling | 0.613 | 0.531 | 0.566 |
| Estimated molecular wt. after coupling | 68,000 | 57,000 | 62,000 |
| Pressing temperature, ° C | 107 | 107 | 107 |
| Tensile strength (p.s.i.) | 1,220 | 1,100 | 1,805 |
| Elongation at break (percent) | 750 | 850 | 910 |
| 100% modulus | 730 | 480 | 475 |
| 300% modulus | 765 | 500 | 515 |

¹ Chlorine.  ² Bromine.  ³ Iodine.

What is claimed is:

1. A process for preparing multi-block copolymers having the general form A—B—A wherein A represents a polymerized substituted aromatic hydrocarbon and B represents a polymerized conjugated diolefinic hydrocarbon having from 4 to 8 carbon atoms, which comprises the steps of polymerizing said substituted aromatic hydrocarbon by anionic polymerization in solution with an alkali metal-hydrocarbyl initiator, adding to the solution of living homopolymer so formed said conjugated diolefinic hydrocarbon and allowing said conjugated diolefinic hydrocarbon to polymerize in solution onto the end of said living homopolymer whereby a living two block copolymer is formed, and coupling said living block copolymer by reacting the live ends thereof with a halogen selected from chlorine, bromine, iodine, iodine monochloride and iodine trichloride, whereby the halogen reacts with the lithium atom associated with the live polymer end and the lithium is removed from association with the polymer, the amount of halogen used being from about ½ to about 2 gram atoms of halogen per gram molecule of initiator, the reaction with halogen taking place at a temperature of from about 0° C. to about 60° C. and under conditions such that the reaction solution remains liquid.

2. A process as claimed in claim 1, wherein the monomers are each allowed to polymerize to substantial completion before the next succeeding step of the process commences.

3. A process as claimed in claim 2 wherein the substituted aromatic hydrocarbon is styrene and the conjugated diolefinic monomer is selected from butadiene and isoprene, and said living block copolymer consists of a block of polystyrene attached at one end to a block of polybutadiene or polyisoprene.

4. A process as claimed in claim 2 wherein said anionic polymerisation is initiated by a lithium hydrocarbyl selected from n-butyl lithium and sec-butyl lithium.

5. A process as claimed in claim 4 wherein the living block copolymer is coupled by reaction with a coupling agent selected from chlorine, bromine and iodine.

6. A process as claimed in claim 5 wherein the coupling agent is chlorine, and is added in gaseous form.

7. A process as claimed in claim 5 wherein the coupling agent is selected from bromine and iodine, and is added as a solution in an inert organic solvent.

References Cited

UNITED STATES PATENTS

| | | | |
|---|---|---|---|
| 3,135,716 | 6/1964 | Uraneck et al. | 260—880 |
| 3,231,635 | 1/1966 | Holden et al. | 260—880 |
| 3,427,364 | 2/1969 | Shaw et al. | 260—879 |

JAMES A. SEIDLECK, Primary Examiner

U.S. Cl. X.R.

260—880 B